US006963588B1

(12) United States Patent
Lynch et al.

(10) Patent No.: US 6,963,588 B1
(45) Date of Patent: Nov. 8, 2005

(54) SYSTEM AND METHODOLOGY FOR AUTOMATICALLY SETTING A CLOCK

(75) Inventors: Richard J. Lynch, Yardley, PA (US); Louis La Medica, Jr., Pittstown, NJ (US); Lee J. Whritenour, West Milford, NJ (US)

(73) Assignee: Cellco Partnership, Bedminster, NJ (US)

( * ) Notice: Subject to any disclaimer, the term of this patent is extended or adjusted under 35 U.S.C. 154(b) by 820 days.

(21) Appl. No.: 09/716,304

(22) Filed: Nov. 21, 2000

(51) Int. Cl.$^7$ .............................................. H04J 3/06
(52) U.S. Cl. ...................................... 370/516; 370/503
(58) Field of Search ................................ 370/320, 503, 370/509, 512, 516, 517, 518, 519; 375/145, 375/149

(56) References Cited

U.S. PATENT DOCUMENTS

| 4,177,454 A | | 12/1979 | Shinoda et al. |
| 5,511,067 A | * | 4/1996 | Miller ........................ 370/335 |
| 5,521,887 A | | 5/1996 | Loomis |
| 5,740,129 A | | 4/1998 | Frampton |
| 5,781,543 A | | 7/1998 | Ault et al. |
| 5,805,530 A | | 9/1998 | Youngberg |
| 6,192,007 B1 | * | 2/2001 | Aoshima ...................... 368/10 |
| 6,201,969 B1 | | 3/2001 | Meier |
| 6,212,398 B1 | * | 4/2001 | Roberts et al. ............. 455/502 |
| 6,300,899 B1 | * | 10/2001 | King ..................... 342/357.12 |
| 6,377,792 B1 | * | 4/2002 | Brown et al. ............... 455/411 |
| 6,553,228 B1 | * | 4/2003 | Kotzin ........................ 455/434 |
| 6,671,291 B1 | * | 12/2003 | Soliman ..................... 370/503 |

OTHER PUBLICATIONS

"Mobile Station-Base Station Compatibility Standard for Wideband Spread Spectrum Cellular Systems," *Electronic Industries Association*, Aug. 31, 1999.

* cited by examiner

*Primary Examiner*—Duc Ho
*Assistant Examiner*—Thien D Tran
(74) *Attorney, Agent, or Firm*—McDermott Will & Emery LLP

(57) ABSTRACT

A system and methodology is described for automatically setting a clock, in which a Code Division Multiple Access (CDMA) mobile station is in communication with a CDMA base station. The base station is constantly transmitting the local time as part of a Sync Channel Message in the synchronization information overhead. The mobile station is configured to extract the local time from the Sync Channel Message and provide the local time for updating the current value of the clock.

8 Claims, 4 Drawing Sheets

SYSTEM AND METHODOLOGY FOR AUTOMATICALLY SETTING A CLOCK

FIELD OF THE INVENTION

The present invention relates to a system and method for automatically setting a clock, such as an automobile dashboard clock.

BACKGROUND OF THE INVENTION

For decades, automobiles have had clocks installed on the dashboard. However, many of these dashboard clocks are inaccurate, losing or gaining time. The dashboard clock also becomes inaccurate when the prevailing time changes (i.e. from daylight savings time to standard time or vice versa). Furthermore, cars are mobile. Thus, driving the car into a different time zone causes the dashboard clock to be off by an hour.

The manual interface for resetting clocks in automobiles, however, can be very difficult, because this manual interface is usually very primitive. For example, the manual interface may only have three buttons: one to reset the time to 12:00, one to advance the hours, and one to advance the minutes. Because of this limited interface, it becomes very cumbersome, for example, to reset the dashboard clock when the dashboard clock happens to be five minutes too fast. In this case, the user has to push the advance-minute button 55 times, or hold it down for quite some time until the advancing minutes wrap around to the correct value. As another example, the first Sunday morning when the prevailing time changes from daylight savings time to standard time requires 11 pushes of the advance-hours button.

Various attempts have been made to provide a system for updating automobile clocks; however, these attempts have often proved impractical due to economic and regulatory constraints. For example, U.S. Pat. No. 5,805,530 to Youngberg discloses a device for communicating the time of day and other information to clocks in various appliances by various instrumentalities, such as an AC mains links for a television. For automobiles, Youngberg indicates that a radio frequency link can be provided from the master clock to the car. A difficulty encountered with the Youngberg system, however, is that cars move around requiring a plurality of master clocks with competing radio frequency links. Providing a large number of these master clocks with radio frequency transmitters entails a considerable infrastructure cost. Moreover, the spectrum for radio frequency communications is highly regulated by agencies such as the Federal Communication Commission, and there is little legal spectrum space available for such applications.

Therefore, there is a need for improving the accuracy of automobile clocks and reducing the necessity to use the cumbersome manual interfaces for updating the current time, especially due to changes in the time zone and prevailing time. Preferably, a solution should not require expensive investments in infrastructure or encounter regulatory difficulties.

SUMMARY OF THE INVENTION

The present invention addresses the above stated needs and overcomes the stated difficulties by using the local time that is already broadcast as part of the signaling of a cellular telephone system by the base stations to reset the automobile clock. In existing cellular telephone systems, procedures already have been developed, tested, and implemented for handing off control from one base station to another. Moreover, the base stations have already been installed, requiring no additional marginal infrastructure costs.

Accordingly, one aspect of the invention is directed to a system for automatically setting a clock, comprising a mobile station and a resettable clock. The mobile station is configured for: acquiring a Code Division Multiple Access (CDMA) pilot signal broadcast from a base station, receiving a CDMA sync channel message based on the pilot signal, and calculating a local time based on the CDMA sync channel message. The resettable clock, coupled to the mobile station, includes an oscillator for maintaining a current time and a processor configured for: periodically obtaining an indication of the local time from the mobile station, and resetting the current time to reflect the local time obtained from the mobile station. In one example, the mobile station can acquire the CDMA pilot signal from another base station to receive the other base station's CDMA sync channel message. Thus, the local time of that other base station can be used, even if the local time is in a different time zone.

In some cases, the logic levels of the mobile station and the resettable clock are incompatible. Therefore, one embodiment provides interface logic coupled between the mobile station and the resettable clock to convert between the incompatible logical levels. In other embodiments, the resettable clock is disposed within an automobile, for example, with a display installed on a dashboard for showing the current time or as part of a navigation system showing the current time and geographic information.

In another embodiment of the invention, the mobile station is configured to set a local time enable value for indicating that a valid local time has been received from the base station. The resettable clock is configured to check the state of the local time enable, and, if the local time enable is set which indicates that the local time is valid, then the local time is used to the reset the current time. Consequently, improper updates to the resettable clock are avoided.

Another aspect of the invention pertains to a method for automatically setting a clock by: acquiring a Code Division Multiple Access (CDMA) pilot signal from a base station; receiving a CDMA sync channel message based on the pilot signal; calculating a local time based on the CDMA sync channel message; maintaining a current time based on an oscillator; periodically obtaining an indication of the local time; and resetting the current time to reflect the local time. In one embodiment, the resetting of the current time is made conditional on a local time enable, which is set to indicate that the local time is valid, when the local time has successfully been obtained from a base station.

Additional objects, advantages, and novel features of the present invention will be set forth in part in the description that follows, and in part, will become apparent upon examination or may be learned by practice of the invention. The objects and advantages of the invention may be realized and obtained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system and method for automatically setting a clock, such as an automobile dashboard clock, are described. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
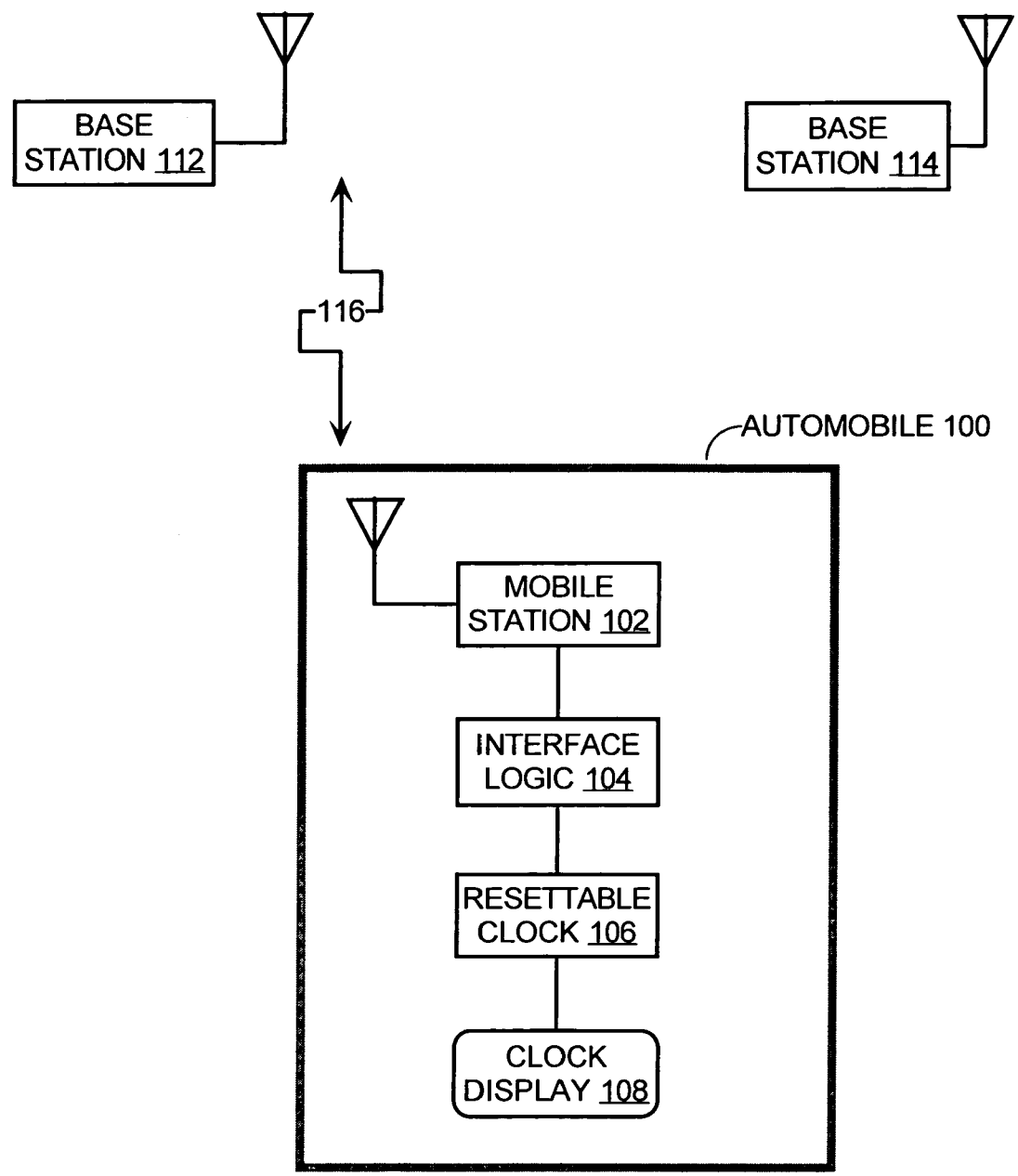
FIG. 1 is a schematic diagram of an automatic clock setting system in accordance with one embodiment of the present invention.

FIG. 1 depicts a configuration for automatically setting a clock within an automobile 100 in accordance with one embodiment. The automobile 100 includes a mobile station 102, an interface logic 104, a resettable clock 106, and a clock display 108. The mobile station 102 is in wireless communication with a base station 112 of a mobile telephone system, which also includes other base stations that are situated at different geographic locations, such as a base station 114.

The mobile station 102 can be a mobile telephone, a personal communication service (PCS) telephone, a cellular telephone, or a custom-built apparatus, adapted to receive Code Division Multiple Access (CDMA) signals for the purposes disclosed herein. CDMA is a technique for spread spectrum multiple-access digital communications that creates channels through the use of unique code sequences. CDMA is used in the United States for cellular services in the 800-MHz bands and for Personal Communication Services (PCS) in the 1900-MHz bands. One implementation of a CDMA system is discussed in U.S. Pat. No. 4,901,307.

With CDMA, each transmitted signal comprises a different pseudorandom binary sequence, also referred to as a pseudonoise (PN) sequence, which modulates a carrier signal, spreading the spectrum of the waveform. Thus, since each CDMA subscriber unit is assigned a unique PN code, a plurality of mobile stations can send and receive CDMA signals sharing the same frequency spectrum. If these CDMA signals were viewed in either the frequency or time domain, the multiple access signals would appear to be superimposed on top of each other. The CDMA signals are separated in the receivers of the base stations or the subscriber stations by using a correlator which accepts only signal energy from the selected binary PN sequence and despreads its spectrum. The CDMA signals from other sources, whose codes do not match the selected binary PN sequence, are not despread in bandwidth and as a result, contribute only to the background noise and represent a self-interference generated by the system.

As familiar to those of ordinary skill, an air-link 116 interface for each cellular service in a geographic area includes a Forward CDMA Channel from the base station 112 to the mobile station 102. The Forward CDMA Channel is subdivided into a number of logically separated code channels, in which code channel 0 is assigned to a Pilot Channel and code channel 32 to a Sync Channel. The remaining code channels may be assigned to Paging Channels (in the range 1 through 7) or to Traffic Channels.

The Pilot Channel is an unmodulated, direct-sequence spread spectrum channel transmitted continuously by each CDMA base station 112 and 114. The Pilot Channel allows a mobile station to acquire the timing of other channels, provides a phase reference for coherent demodulation, and allows for signal strength comparisons between the base stations 112 and 114 for determining when to hand off. The Sync Channel transports a synchronization message to the mobile station 102. The Paging Channels are used for transmission of control information and pages from the base station 112 to the mobile station 102. The Traffic Channels transport user and signaling information between the base station 112 and the mobile station 102.

Figure 2:
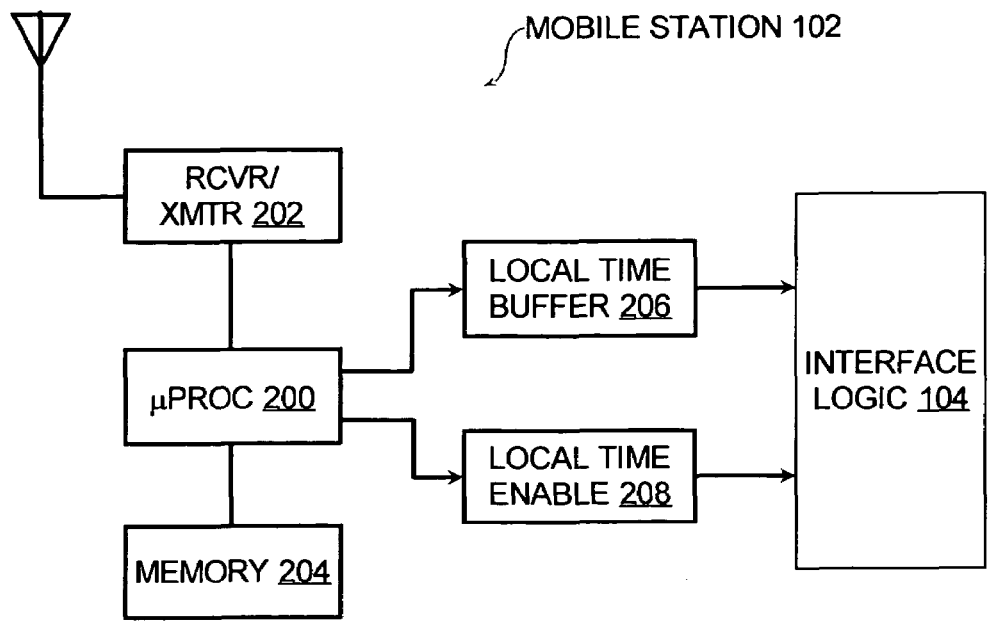
FIG. 2 is a schematic diagram of one implementation of a mobile station depicted in FIG. 1.

FIG. 2 depicts one implementation of the mobile station 102, which could be part of a mobile or PCS telephone or could be specially designed for automatically setting clocks, comprising a receiver 202 that can communicate with base station 112 of FIG. 1 via air-link 116. The mobile station 102 may be a special unit, consisting essentially of parts described herein or a full telephone with parts not shown, such as microphone, speaker, keypad, and display for performing additional functionality typically of a mobile phone. For example, in a full telephone implementation, the unit 202 may also include a transmitter for sending voice and signaling traffic to the base station 112 and ultimately to a terminating telephone or other device.

Further, the mobile station 102 contains control circuitry for controlling the reception of data by the receiver 202. In FIG. 2, this control circuitry is rendered as a microprocessor 200. The microprocessor 200 is coupled to a memory 204, such as a random access memory (RAM), a read-only memory (ROM), a combination thereof, or any other computer-readable medium or combinations thereof. The memory 204 provides the microprocessor 202 with executable instructions for performing operations in accordance with various embodiments of the invention, as described in more detail hereinafter.

Additionally, the mobile station 102 includes a local time buffer 206 for holding an indication of the local time of day appropriate for the locality within which the mobile station 102 is located. Bits stored in the local time buffer 206, which can be a register, latch, computer memory, or any other data storage device, may represent the local time in any of a variety of ways, for example, in an expanded format indicating separately the hours, minutes, and seconds of the day, as the number of 80 milliseconds (ms) that have elapsed from a reference time, or as the number of seconds that have elapsed from midnight for the current day.

In addition, the mobile station 102 includes a local time enable 208, which can be a one-bit register or latch, for indicating that the indication in the local time buffer 206 in either of two states: "set" for valid and "reset" for invalid. The local time buffer 206 is in the reset state, for example, from upon application of power until a local time is calculated. At this point the local time buffer 206 is set to indicate a valid local time value. In most embodiments, both the local time buffer 206 and the local time enable 208 are configured to output their values to the interface logic 104.

Referring back to FIG. 1, the interface logic 104 is provided for making appropriate electrical conversions in the logic levels supported by the mobile station 102 and the resettable clock 106. Typically, the mobile station 102 and the resettable clock 106 are provisioned by different vendors and employ incompatible logic levels. In general, logic levels of two devices are considered incompatible if the electrical levels of one device do not represent the same logical values on the other device. For example, the mobile station 102 might be implemented with a 3V CMOS logic, but the resettable clock 106 might be implemented in 5V TTL logic. In this case, a 3V CMOS logical high is insufficient to properly drive a logical value for a 5V TTL logic system. The actual implementation of the interface logic 104 is therefore dependent on the logic levels employed by the mobile station 102 and the resettable clock 106; however, persons of ordinary skill can appropriately implement the interface logic 104 using pull-up resisters and the like once the logic levels of the mobile station 102 and the resettable clock 106 have been specified.

Figure 3:
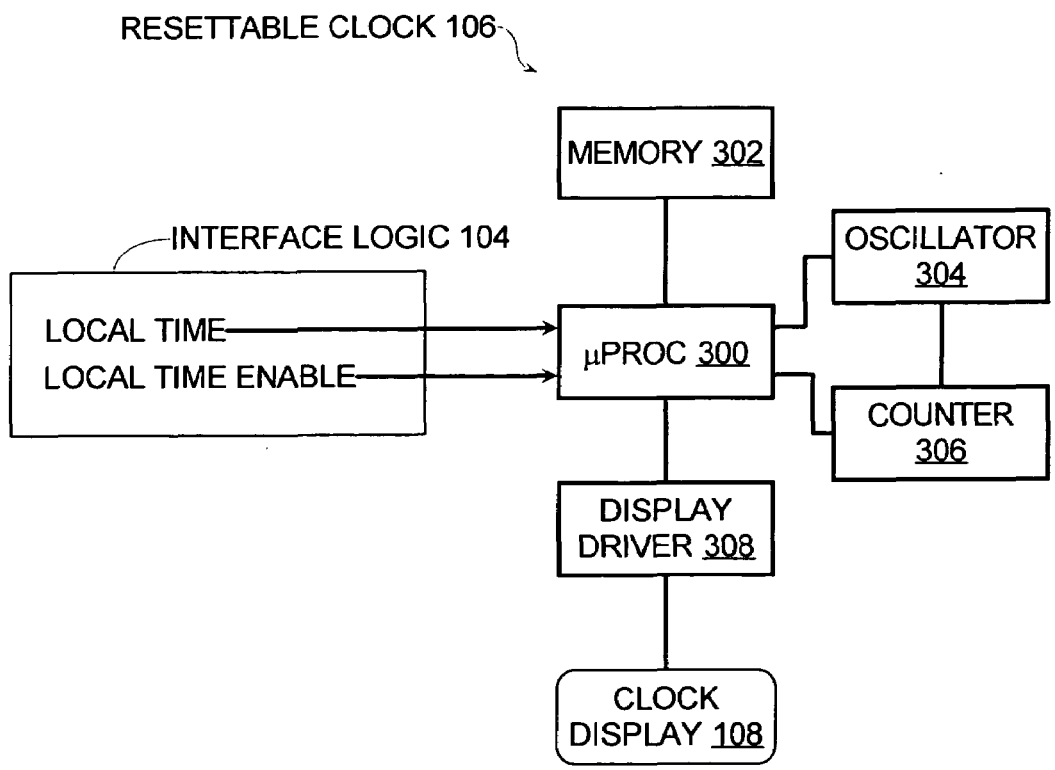
FIG. 3 is a schematic diagram of one implementation of a resettable clock depicted in FIG. 1.

FIG. 3 is a schematic diagram of an implementation of a resettable clock 106 in accordance with one embodiment. The resettable clock 106 includes a microprocessor 300 coupled to a memory 302 for providing storage of instructions and data for the microprocessor 300. In addition, the resettable clock 106 includes an oscillator 304, such as a quartz crystal vibrating at 32,768 Hz or a voltage-controlled oscillator subject to finer calibration. A counter 306 is coupled to resettable clock 106 for maintaining a current time value by counting an appropriate number of cycles output from the oscillator 304 and incrementing the current time value when the number of cycles in a second, for example, has been counted. An appropriate number of cycles for the 32,768 Hz quartz crystal oscillator, for example, would be 32,768 cycles for a one-second resolution counter. In various embodiments, the resettable clock 106 can be affixed to the automobile 100 of FIG. 1 as a dashboard clock, as part of an on-car diagnostic computer, as part of a navigational system, etc.

Furthermore, the microprocessor 300 is configured (by executable instructions in the memory 302, for example) for accessing the counter 306 to obtain the current time value and convert the current time value into a convenient, displayable format, such as hours and minutes. Accordingly, the resettable clock 106 includes a display driver 308, coupled to and controlled by the microprocessor 300, for providing an indication of the formatted, current time on the clock display 108. The clock display 108 is capable of various implementations, including a light-emitting diode (LED) display, a liquid crystal display (LCD), a cathode ray tube (CRT), an active matrix display, or any other display such as part of the display of a navigational system.

During operation, the base stations 112 and 114 of FIG. 1 are constantly transmitting the local time as part of the synchronization information overhead in operating a CDMA system. Accordingly, the mobile station 102 is configured to extract the local time from the synchronization information present in the CDMA signals and provide the local time for updating the current value of the resettable clock 106.

Figure 4:
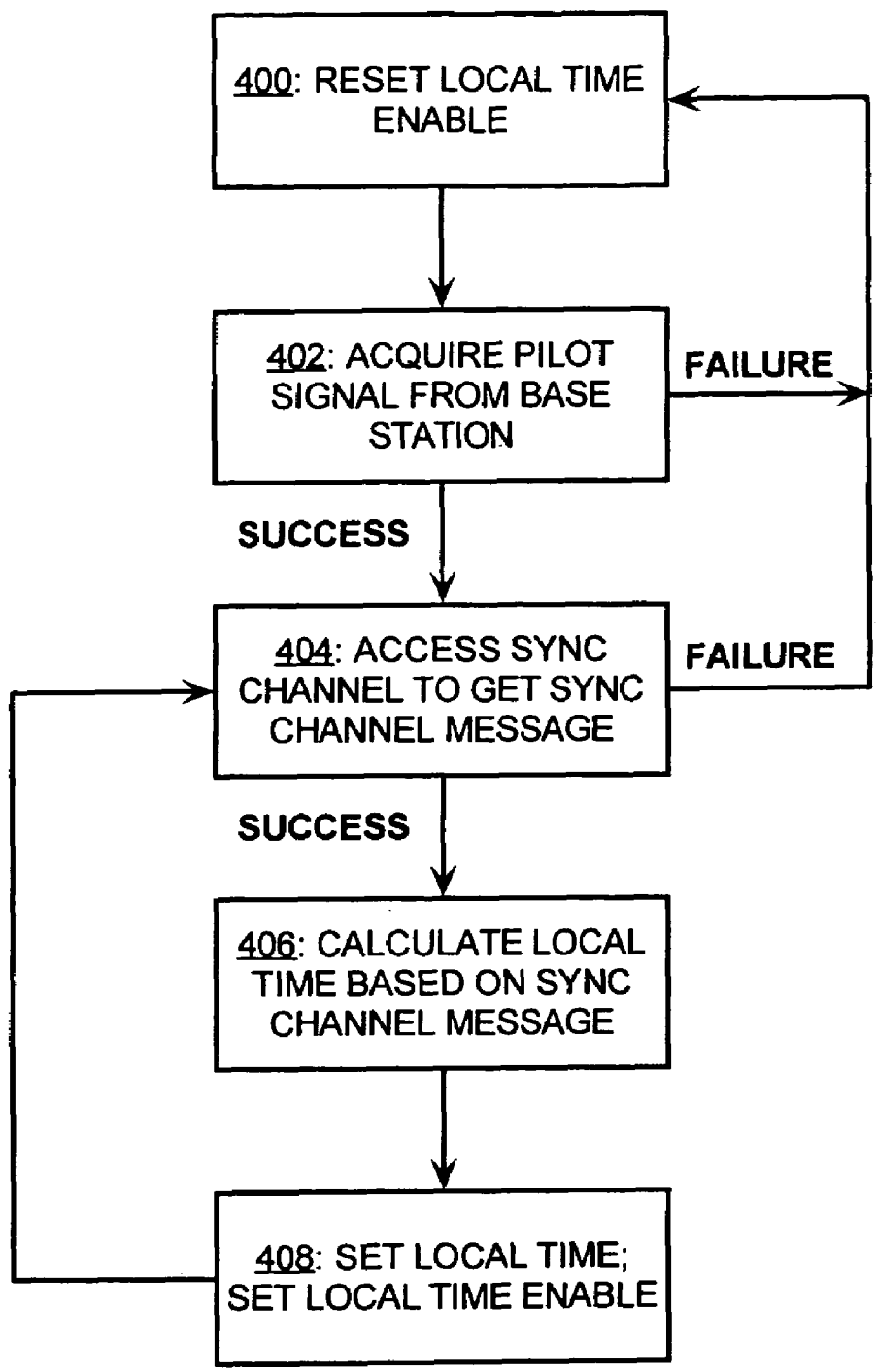
FIG. 4 is a flowchart illustration the operation of the mobile station depicted in FIG. 1 in accordance with one embodiment of the present invention.

In one embodiment, the mobile station 102 is configured (as by appropriate instructions stored in memory 204 for microprocessor 200) to perform the steps illustrated in FIG. 4. Upon initialization or start-up, for example, ignition of the car, the mobile station 102 performs step 400, in which the local time enable 208 is reset. A reset state of the local time enable 208 indicates that whatever value stored in the local time buffer 206 is not valid, which is proper upon start-up because the local time has not yet been obtained from the base station 112.

At step 402, the mobile station attempts to acquire a pilot signal from one of the base stations 112 and 114. In a mobile telephone network, the pilot signal is transmitted along the Pilot Channel in every cell and is used by the mobile station 102 to obtain initial system synchronization and to provide robust time, frequency, and phase tracking of the signals from the base station 112. This pilot signal is tracked continuously by the mobile station 112. The pilot signals are transmitted by each of the base stations 112 and 114 using the same quadrature spreading code, but with different spread spectrum code phase offsets, allowing the pilot signals from the different base stations 112 and 114 to be distinguished. The fact that the pilot signals all use the same quadrature spreading code allows the mobile station 102 to find system timing synchronization by a single search through all the code phases, thereby speeding up the process of the pilot signal acquisition within the cell. If the mobile station 102 is able to detect more than one pilot signal, then the mobile station 102 acquires the stronger pilot signal, which belongs to the geographically better base station, in FIG. 1, base station 112. The actual Pilot Channel data is a series of zeros. One implementation for acquiring a CDMA pilot signal is discussed in U.S. Pat. No. 5,781,543.

If the mobile station 102 is unable to acquire the pilot signal from the base station 112, because, for example, the mobile station 102 is located in a deep underground tunnel or in a deserted area, then control loops back to step 400, where the local time enable 218 is maintained in the reset (invalid) state. After the passage of some time, the mobile station 102 may proceed again to step 402 and re-attempt to acquire a pilot signal.

If, on the other hand, the mobile station 102 is able to acquire the pilot signal from the base station 112, then control proceeds to step 404. At step 404, the mobile station 102 attempts to access the Sync Channel to obtain a Sync Channel Message. The Sync Channel, logically located on code channel 32, uses the same pseudonoise sequence and phase offset as the Pilot Channel and can be demodulated whenever the Pilot Channel is being tracked. The data in the Sync Channel is sent from the base stations 112 and 114 in the form of a Sync Channel Message, which provides time and frame synchronization to the mobile station 102.

In accordance with one standard, namely, ANSI/TIA/EIA-95-B-1999, approved Feb. 3, 1999, the Sync Channel Message has the following fixed-length message format:

TABLE 1

| Field | Length (bits) |
| --- | --- |
| MSG_TYPE | 8 |
| P_REV | 8 |
| MIN_P_PREV | 8 |
| SID | 15 |
| NID | 16 |
| PILOT_PN | 9 |
| LC_STATE | 42 |
| SYS_TIME | 36 |
| LP_SEC | 8 |
| LTM_OFF | 6 |
| DAYLT | 1 |
| PRAT | 2 |
| CDMA_FREQ | 11 |

The non-time-related fields are explained as follows. The MSG_TYPE field indicates the massage type and is set to a constant '00000001'. The P_REV field and the MIN_P_REV field indicate the protocol revision level of the base station 112 and the minimum protocol revision level supported by the base station 112, respectively. The SID field and the NID fields provides the system identification number for the system and the sub-identifier for the system, respectively. The PILOT_PN field contains the pilot pseudonoise (PN) sequence offset index for the base station 112 in units of 64 PN chips, and the LC_STATE stores the long code state at the time given by the SYS_TIME field of this message. The PRAT field is used for indicating the Paging Channel data rate (e.g. 9600 bps, 4800 bps, etc.), and the CDMA_FREQ holds the frequency assignment for the primary Paging Channel in the form of a code number.

The time-related fields of the Sync Channel Message include the SYS_TIME field, the LP_SEC field, the LTM_OFF field, and the DAYLT field. The SYS_TIME field is set to the System Time in units of 80 ms at a specified point in the transmission of the Sync Channel Message. The System Time is synchronous to Universal Coordinated Time (UTC time) except for leap seconds and uses the same time origin as Global Positioning System (GPS) time. All base stations 112 and 114 use the same System Time within a small, allowable error, and the mobile station 102 utilizes the same System Time, but offset by the propagation delay from the base station 112 to the mobile station 102.

The LP_SEC field stores the number of leap seconds that have occurred since the start of System Time. The LTM_OFF field contains the two's complement offset of local time from System Time in units of 30 minutes. For example, since Eastern Standard Time(EST) is 5 hours offset from UTC time, the LTM_OFF field for EST would be −5 or '111011' in 6-bit two's complement. Finally, the DAYLT field is for the daylight savings time indicator, more specifically, '1' if daylight savings time is in effect and '0' is daylight savings time is not in effect.

If the mobile station 102 is unable to obtain a valid Sync Channel Message (as determined, for example, by an invalid CRC code appended thereto) from the base station 112, then control loops back to step 400, where the local time enable 208 is maintained in the reset (invalid) state. After the passage of some time, the mobile station 102 may proceed again to step 402 and re-attempt to acquire a pilot signal or, if the pilot signal is still acquired, to step 404 to re-attempt obtaining a valid Sync Channel Message.

If, on the other hand, the mobile station 102 is able to obtain a valid Sync Channel Message from the base station 112, then control proceeds to step 406. At step 406, the local time is calculated based on the information in the Sync Channel Message. For example, the local time in units of 80 ms from the start of System Time is equal to SYS_TIME−(LP_SEC×12.5)+(LTM_OFF×22,500)+(DAYLT×45,000).

At step 408, the mobile station 102 stores the local time calculated in step 406 in the local time buffer 206 and sets the local time enable 208 to indicate that the value in the local time buffer is valid. At some time later, control loops back to step 404, where another CDMA Sync Channel Message is obtained from the Sync Channel to provide a more current local time value.

Figure 5:
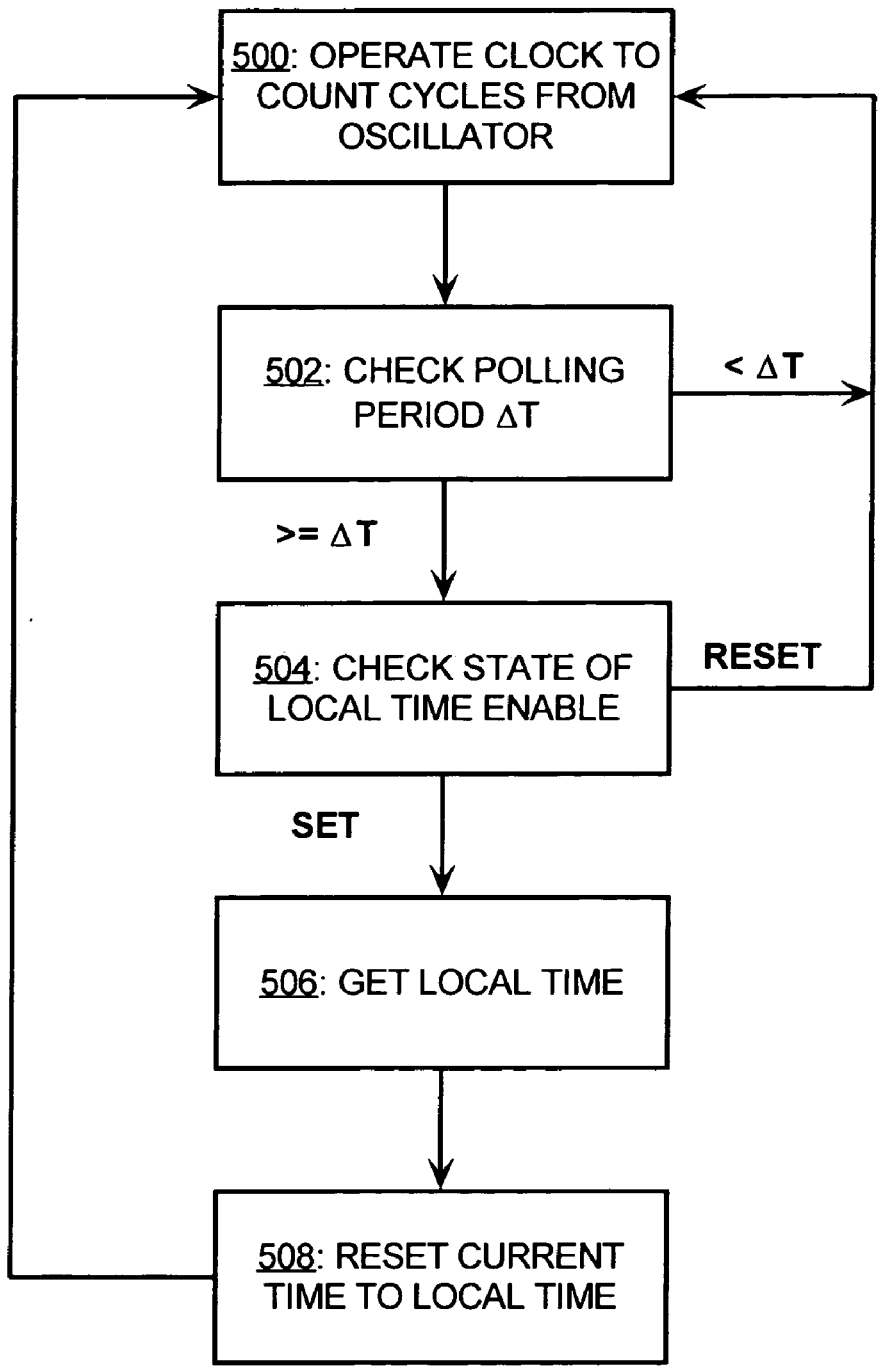
FIG. 5 is a flowchart illustration the operation of the resettable clock depicted in FIG. 1 in accordance with one embodiment of the present invention.

Meanwhile, the resettable clock 106 is performing the steps illustrated in FIG. 5. More specifically, at step 500, the resettable clock 106 operates as usual, in which the oscillator 304 regularly produces a series of clock ticks that are counted by the counter 306. After the counter 306 counts an appropriate number of clock ticks, the counter 306 increments its value. For example, if the local time is stored on counter 306 in units of 1 second and if the oscillator 304 is a 36768 HZ quartz oscillator, then the counter 306 should increment after every 36768 clock ticks from the oscillator 304. After every second, the counter 306 generates and transmits an interrupt to microprocessor 300, which in response, formats the current time value in the counter 306 and controls the display driver 308 to show the current time on clock display 108.

At step 502, the resettable clock 106 checks to see if a certain number of seconds ΔT has elapsed for a polling period. For example, if ΔT is set to 15 minutes, then the resettable clock 106 checks to see if it has been 15 minutes since the last time the resettable clock 106 has updated its current time to reflect the local time obtained from the mobile station 102. The length of the polling period may be fixed to a time such as 10 or 15 minutes or made configurable by, for example, an automobile diagnostic processor included in the automobile 100.

If the polling period has not elapsed, then control returns to step 500 where the resettable clock 106 operates as usual (counting ticks from the oscillator 304) and updating the clock display 108), until the polling period elapses. If, on the other hand, the polling period has elapsed, then execution proceeds to step 504, were the resettable clock 106 obtains and checks the local time enable 208 from the mobile station 102 via the interface logic 104. If the local time enable 208 is reset, indicating that the value in the local time buffer 206 is invalid, then execution loops back to step 500 where the resettable clock 106 normally operates as usual.

If, on the other hand, the local time enable 208 is set, indicating that the local time buffer 206 contains a valid local time, then the local time is obtained from the local time buffer 206 at step 506. The new local time is used, in step 508, to reset the current time, either in counter 306 or in values stored in memory 302 that are combined with the current time to generate formatted display of the current time. After the current time is reset, control returns to step 500 wherein the resettable clock 106 operates as usual.

Accordingly, one embodiment of a system and method for automatically setting a clock is described, that is particularly useful in automobiles. By acquiring the local time from a cellular telephone system, the mobile station 102 is able to acquire the current local time from the most geographically relevant base station. As the automobile 110 moves from time to time, the mobile station 102 acquires pilot signals from different base stations, which transmit the correct local time for the time zone. Shortly after the automobile enters a new time zone and acquires a pilot signal from a base station in the new time zone, the resettable clock is automatically set to the correct local time for the time zone.

This embodiment is also beneficial when daylight savings time goes into or out of effect. The first occasion in the new prevailing time (daylight savings or standard time), for example, shortly after ignition on that Sunday morning, the mobile station 102 obtains the correct indication of the daylight saving time and provides the correct local time information for the resettable clock 106. Consequently, the resettable clock is automatically set to the correct prevailing time.

In addition, many automobile clocks are inaccurate, in part because of variations in the oscillator 304. By periodically obtaining the correct local time from the mobile station 102, the inaccurate current time is periodically adjusted to be accurate. Consequently, the resettable clock in automatically set to a more accurate time.

As mentioned herein above, the user interface for manually updating an automobile dashboard is cumbersome and annoying. However, automatically setting the clock as described herein avoids much if not all need to use the cumbersome manual interface.

In contrast with other solutions, the infrastructure for proving the local time signals already exists as part of the cellular telephone system. In fact, no modifications are required to be made to the base stations 112 and 114, because the base stations 112 and 114 are already configured to broadcast the Sync Channel Message.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A system for automatically setting a clock, comprising:
    a mobile station providing two-way voice telephone communications, the mobile station being configured for:
    acquiring a Code Division Multiple Access (CDMA) pilot signal from a base station,
    receiving a CDMA sync channel message based on the pilot signal, and
    calculating a local time based on the CDMA sync channel message; and
    a resettable clock, external and coupled to the mobile station, the clock including an oscillator, a processor for maintaining a current time based on output of the oscillator and a display for outputting the current time to a user, the processor being configured for:
    periodically obtaining an indication of the local time from the mobile station, and
    resetting the current time to reflect the local time obtained from the mobile station.

2. The system according to claim 1, further comprising interface logic coupling the mobile station and the resettable clock; wherein:
    the mobile station is configured to operate at a first logic level;
    the resettable clock is configured to operate at a second logic level that is incompatible with the first logic level; and
    the interface logic is configured to receive the indication of the local time at the first logic level and provide the indication of the local time to the resettable clock at the second logic level.

3. The system according to claim 1, wherein:
    the mobile station is further configured for:
    acquiring another CDMA pilot signal from another base station,
    receiving another CDMA sync channel message based on the other CDMA pilot signal, and
    calculating a new local time based on the other CDMA sync channel message; and
    the resettable clock is further configured for resetting the current time to reflect the new local time.

4. The system according to claim 3, wherein the local time and the new local time indicate local times in different time zones.

5. The system according to claim 1, wherein the mobile station is further configured to use the CDMA sync channel message to receive a transmission from the base station in a paging or traffic channel.

6. The system according to claim 1, wherein the resettable clock is disposed within an automobile.

7. The system according to claim 6, wherein the display is installed on a dashboard of the automobile for showing the current time to one or more passengers in the automobile.

8. The system according to claim 7, wherein the display is further for showing geographic information.

\* \* \* \* \*